(12) United States Patent
Kishibata et al.

(10) Patent No.: US 7,032,440 B2
(45) Date of Patent: Apr. 25, 2006

(54) ENGINE ROTATION INFORMATION DETECTION DEVICE

(75) Inventors: Kazuyoshi Kishibata, Numazu (JP); Yuichi Kitagawa, Numazu (JP); Hiroyasu Sato, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/006,104

(22) Filed: Dec. 7, 2004

(65) Prior Publication Data

US 2005/0120782 A1    Jun. 9, 2005

(30) Foreign Application Priority Data

Dec. 8, 2003    (JP) .............................. 2003-408721

(51) Int. Cl.
  *G01M 15/00*    (2006.01)
(52) U.S. Cl. ..................... 73/117.3; 73/116; 73/117.2; 73/118.1
(58) Field of Classification Search ............... 73/117.3, 73/118.1, 116, 117
  See application file for complete search history.

(56) References Cited

U.S. PATENT DOCUMENTS 5,630,396 A * 5/1997 Fukui et al. ........... 123/406.18
6,644,273 B1 * 11/2003 Hagari et al. .......... 123/406.18
6,745,121 B1 * 6/2004 Watanuki et al. ........... 701/114
6,784,658 B1 * 8/2004 Kawagoe et al. ........... 324/163
6,827,063 B1 * 12/2004 Breitegger et al. ..... 123/406.58
6,935,168 B1 * 8/2005 Shimoyama ............... 73/117.3
6,946,830 B1 * 9/2005 Hayashi et al. ......... 324/207.25

FOREIGN PATENT DOCUMENTS

JP    61-025017    3/1986

* cited by examiner

*Primary Examiner*—Edward Lefkowitz
*Assistant Examiner*—Freddie Kirkland, III
(74) *Attorney, Agent, or Firm*—Pearne & Gordon LLP

(57) ABSTRACT

An engine rotation information detection device including: a generator that rotates in synchronization with an engine to output an AC voltage; a pulse signal generator that detects reluctors of a rotor having many reluctors and one reluctor missing portion to generate a pulse; counting means that counts the number of detections of a zero point of a waveform of the AC voltage in each detection section, the detection section being a section between a crank angle position where the pulse signal generator detects an edge of each reluctor and a crank angle position where the pulse signal generator detects a next reluctor; and reference crank angle position identification means that specifies a detection section including the reluctor missing portion from a count value counted by the counting means and identifies a pulse generated at a reference crank angle position based on the specified detection section.

5 Claims, 14 Drawing Sheets

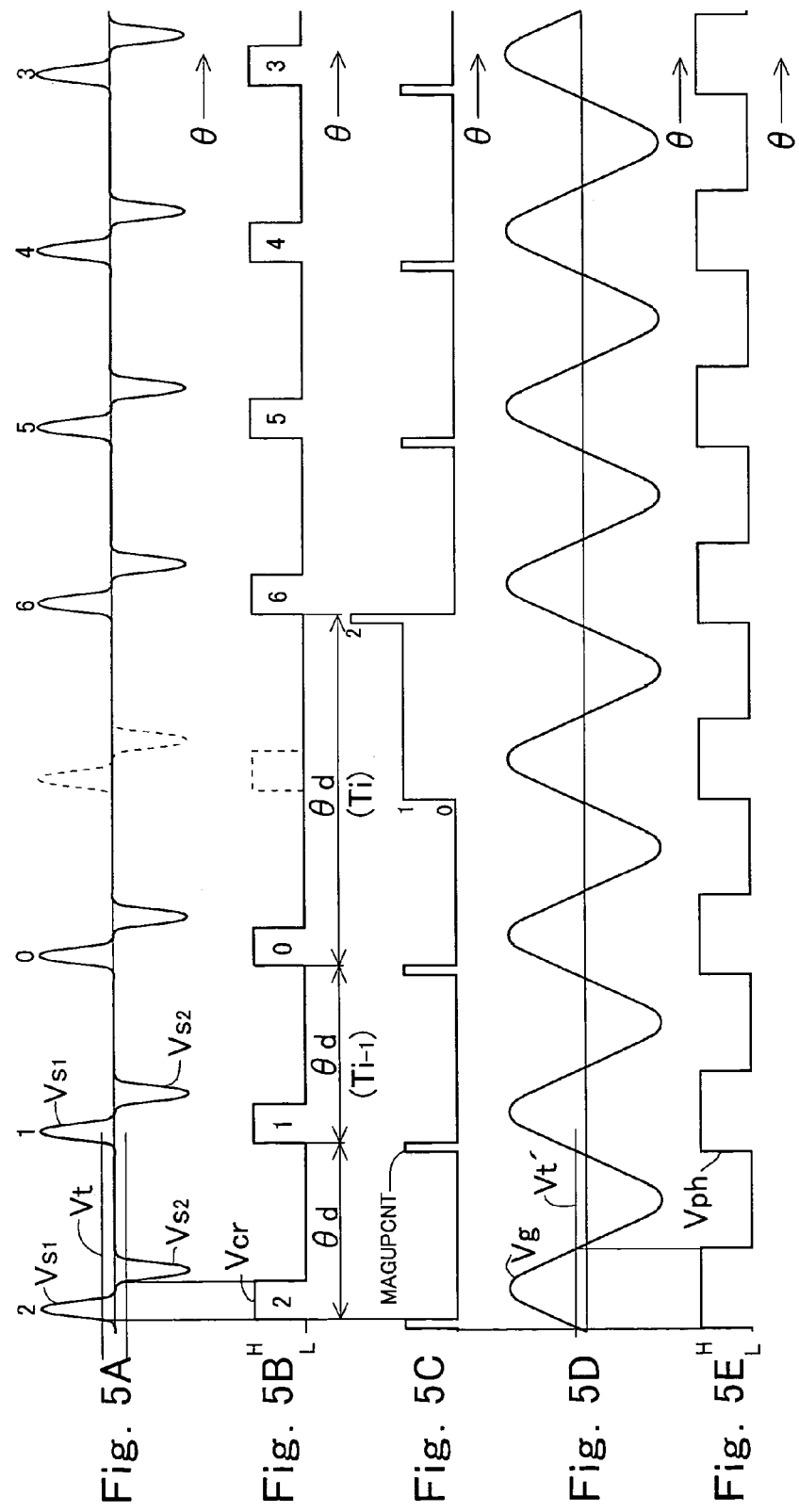

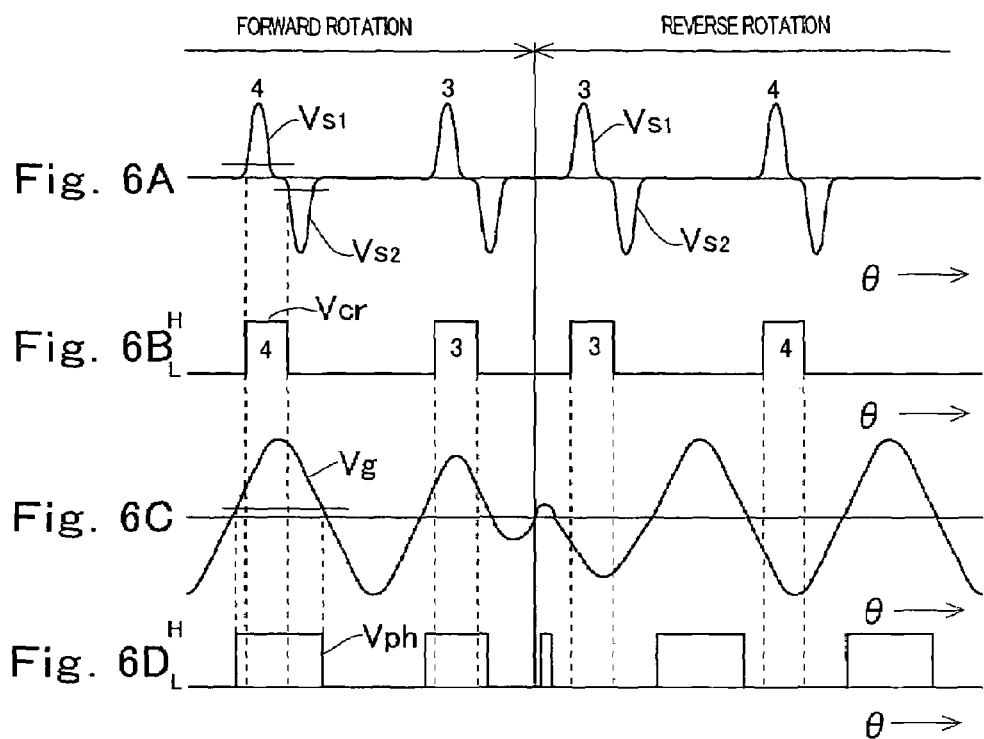
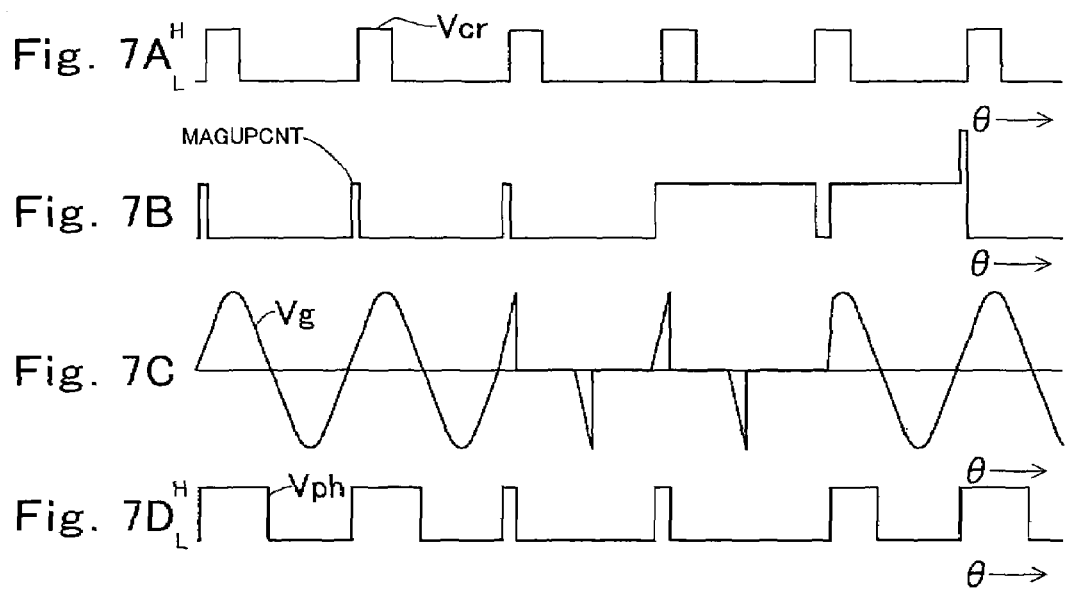

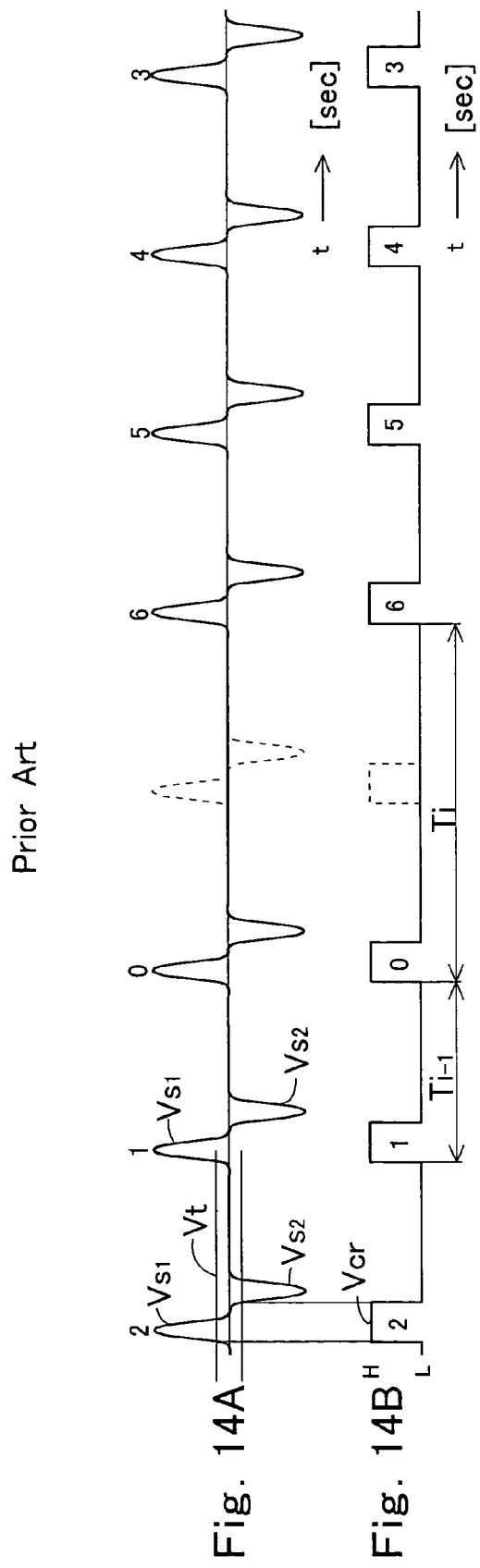

Prior Art
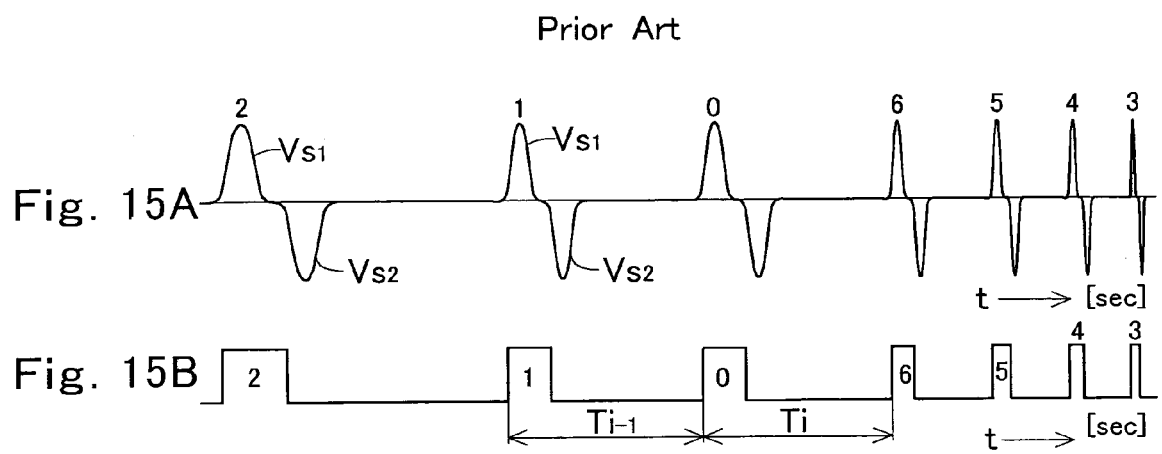
Fig. 15A
Fig. 15B
Fig. 16
Prior Art
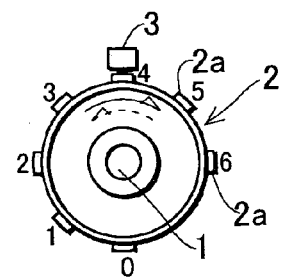

Prior Art

ENGINE ROTATION INFORMATION DETECTION DEVICE

TECHNICAL FIELD OF THE INVENTION

The present invention relates to a device for detecting rotation information including information on a reference crank angle position used for controlling an ignition position of an engine or a fuel injection time by a microcomputer.

BACKGROUND OF THE INVENTION

When a controlling object (such as an ignition device or a fuel injection device) included in an engine is controlled by using a microcomputer, a reference crank angle position is previously determined to detect timing for the controlling object to perform a predetermined operation with respect to the reference crank angle position. When a rotational speed of the engine needs to be obtained, a time between detection of each reference crank angle position and detection of a next reference crank angle position is measured to arithmetically operate the rotational speed of the engine from the measured time.

For example, in the case where an ignition position (a crank angle position for an ignition operation) of the engine is controlled, the ignition position is arithmetically operated with respect to the rotational speed of the engine, and when the arithmetically operated ignition position is detected, an ignition signal is provided to an ignition circuit for the ignition operation. In this case, the ignition position is arithmetically operated in the form of a time (ignition timer timing data) required for a crankshaft to rotate from the reference crank angle position to the ignition position. The microcomputer causes an ignition timer to start measurement of timing data when the reference crank angle position is detected, and provides the ignition signal to the ignition circuit for the ignition operation when the ignition timer completes the measurement of the timing data.

A known method for detecting a reference crank angle position of an engine is described in Japanese Patent Application Laid-Open Publication No. 61-25017. In the method described in Japanese Patent Application Laid-Open Publication No. 61-25017, as shown in FIG. 13, a rotor 2 having on an outer periphery thereof many reluctors (teeth) 2a and one reluctor missing portion 2b used for detecting the reference crank angle position is mounted to a crankshaft 1 of the engine. The reluctor missing portion 2b is formed by removing one of the many reluctors 2a arranged at regular angular intervals on the outer periphery of the rotor, and the angular intervals between each of the series of reluctor 2a are equal except a portion provided with the reluctor missing portion.

In FIG. 13, a reference numeral 3 denotes a pulse signal generator that detects a leading edge and a trailing edge in a rotational direction of each reluctor 2a to generate a pulse. This pulse signal generator detects an edge of any reluctor of the rotor 2 to generate a pulse when a crank angle position of the engine matches the reference crank angle position. A series of pulses generated by the pulse signal generator 3 is provided through a waveform shaping circuit 4 to a CPU (a microcomputer) 5. The CPU 5 performs a predetermined arithmetical operation to identify generation intervals of the pulses, detects the reluctor missing portion 2b from the identification results, and identifies a pulse generated at the reference crank angle position based on the detected reluctor missing portion 2b.

A pulse generated when the pulse signal generator detects the leading edge in the rotational direction of each reluctor is herein referred to as a leading edge pulse, and a pulse generated when the pulse signal generator detects the trailing edge in the rotational direction of each reluctor is herein referred to as a trailing edge pulse.

In the example in FIG. 13, seven reluctors 2a to which numbers from 0 to 6 are assigned are provided on the outer periphery of the rotor, the reluctors with the numbers from 0 to 6 are provided at regular angular intervals, and an interval between the number 6 reluctor and the number 0 reluctor is set to twice the interval between other reluctors to provide the reluctor missing portion 2b between the number 6 reluctor and the number 0reluctor 2a. Pole arc angles of the reluctors 2a are equal.

FIGS. 14A and 14B are timing charts showing a waveform of the pulses generated by the pulse signal generator 3 and output signals of the waveform shaping circuit 4. In FIG. 14A, Vs1 and Vs2 denote the leading edge pulse and the trailing edge pulse, respectively, generated by the pulse signal generator 3. Numbers on the leading edge pulses denote the numbers of corresponding reluctors. As shown in FIG. 14B, the waveform shaping circuit 4 generates rectangular wave crank angle pulses Vcr that reach an H level (a high level) between timing when the leading edge pulse Vs1 reaches a threshold and timing when the trailing edge pulse reaches a threshold. Pulse widths of the crank angle pulses Vcr with numbers from 0 to 6 correspond to the pole arc angles of the reluctors 2a with the numbers from 0 to 6, and decrease with an increase in a rotational speed of the crankshaft.

The CPU 5 reads a measurement value of a timer that counts a clock pulse, for example, every time a rising edge of the crank angle pulse Vcr is detected to detect generation intervals of the crank angle pulses. When a generation interval Ti of a crank angle pulse detected this time is α or more times longer than a generation interval Ti-1 of a crank angle pulse detected last time (α is a recognition constant larger than one), the CPU 5 recognizes that the current pulse generation interval includes a reluctor missing portion, and identifies a pulse generated by the pulse signal generator at a position having a fixed positional relationship with the reluctor missing portion as a pulse generated at the reference crank angle position.

In the method described in Japanese Patent Application Laid-Open Publication No. 61-25017, the generation interval Ti-1 of the preceding crank angle pulse is multiplied by a large recognition constant α during extremely low speed rotation of the engine with large pulsation of rotation of the crankshaft, in order to prevent the pulse generation interval Ti detected this time from being α or more times longer than the preceding pulse generation interval Ti-1 though not in the reluctor missing portion to be misidentified as the reluctor missing portion during the extremely low speed rotation. Further, the preceding pulse generation interval Ti-1 is multiplied by a recognition constant α switched according to the rotational speed of the engine in order to eliminate a problem that the reluctor missing portion cannot be detected because the current pulse generation interval is not α or more times longer than the preceding pulse generation interval Ti-1.

If the preceding pulse generation interval Ti-1 is multiplied by the recognition constant α switched according to the rotational speed of the engine, the possibility of misidentifying the reference crank angle position by misidentifying the reluctor missing portion can be reduced. In such a case, however, an initial blast (initial combustion) of the engine occurs at cranking (a start) of the engine, the rotational speed of the engine increases at high acceleration, and, as shown in FIG. 15B, the current pulse interval Ti does not exceed α times of the preceding pulse interval Ti-1 when the pulse interval observed at the time of passage of the reluctor missing portion is narrowed. Thus, there is a possibility of misidentification as not the reluctor missing portion though the reluctor missing portion is passed.

When the large recognition constant α is set during the extremely low speed rotation in order to prevent misidenting the reluctor missing portion by the pulsation of the rotational speed during the low speed rotation of the engine, there tends to be a high possibility of misidentification at the initial blast of the engine. In order to prevent this, it is supposed that the recognition constant at the initial blast of the engine is set to a small value and switched to a large value when the initial blast is completed, but the rotational speed of the engine immediately before the initial blast is a cranking speed itself and extremely unstable, and thus it is difficult to switch the recognition constant at the instant of the initial blast.

For an engine with a small number of cylinders such as a single cylinder engine, rotational resistance of the engine significantly differ depending on strokes (suction, compression, expansion, exhaust), which increases pulsation of a rotational speed during extremely low speed rotation to increase the possibility of misidentifying a reluctor missing portion.

If the engine is-ignited when a piston is pushed back in a compression stroke by an insufficient cranking force in a start operation of the engine, the engine rotates in reverse. Thus, when the engine is about to rotate in reverse, it is desirable to detect the reverse rotation and prevent ignition of the engine. By the conventional reference crank angle position detection method, however, the reverse rotation of the engine cannot be detected as described below.

It is supposed that a rotational direction shown by a solid line arrow and a rotational direction shown by a broken line arrow in FIG. 16 are a forward direction and a reverse direction of the engine, respectively, and the engine is in a forward rotation state and then reversed immediately after the number 3 reluctor is detected by the pulse signal generator 3. At this time, a time chart showing pulse signals generated by the pulse signal generator 3 is as shown in FIG. 17A. Pulses with reference characters "a" and "b" in FIG. 17A denote leading edge pulses and trailing edge pulses, respectively. FIG. 17B shows crank angle pulses Vcr, and numbers on the crank angle pulses correspond to the numbers of the reluctors.

As is apparent from FIGS. 17A and 17B, by the conventional detection method, the pulse signal is detected even when the engine rotates in reverse similarly to when the engine rotates forward, and thus the reverse rotation of the engine cannot be detected.

SUMMARY OF THE INVENTION

An object of the invention is to provide an engine rotation information detection device that eliminates the possibility of misidentifying a reference crank angle position at a start of an engine and always properly controls an ignition position of the engine or a fuel injection time.

Another object of the invention is to provide an engine rotation information detection device that can detect reverse rotation of the engine besides information on the reference crank angle position.

The invention relates to a rotation information detection device that detects rotation information including information on a reference crank angle position of an engine. The rotation information detection device according to the invention is comprised of the following components.

(a) A signal generating device including a rotor in which one of n reluctors (n is an integer equal to or more than three) arranged at regular intervals in a rotational direction of a crankshaft of the engine is missed, a total of n-1 reluctors are arranged in the rotational direction, and a portion from which the above described one reluctor is missed is a reluctor missing portion, and a pulse signal generator that detects an edge of each of the n-1 reluctors provided on the rotor to generate a pulse, the pulse signal generator detecting an edge of any reluctor of the rotor to generate a pulse when a crank angle position of the engine matches the reference crank angle position.

(b) A generator that rotates in synchronization with the crankshaft to output an n-cycle AC voltage.

(c) Counting means that counts the number of detections of a singular point of a waveform of the AC voltage in each detection section, the detection section being a section between a crank angle position where the pulse signal generator detects the edge of each reluctor to generate a pulse and a crank angle position where the pulse signal generator detects a next reluctor to generate a pulse.

(d) Reference crank angle position identification means that uses a difference between a count value counted by the counting means in a detection section including the reluctor missing portion and a count value counted by the counting means in other detection sections to specify the detection section including the reluctor missing portion and identify a pulse generated at the reference crank angle position based on the specified detection section.

The singular point is a point specially determined so as to be specified as a subject to be detected, and a zero point or a peak point of the waveform of the AC voltage, or a point at which a voltage of a half wave of one polarity of the AC voltage reaches a predetermined threshold value.

As described above, the difference between the count value counted by the counting means in the detection section including the reluctor missing portion and the count value counted by the counting means in other detection sections is used to specify the detection section including the reluctor missing portion without identifying lengths of generations interval of the pulses, thereby allowing the detection section including the reluctor missing portion to be properly specified to identify the pulse generated at the reference crank angle position, even if an initial blast of the engine occurs at a start of the engine and a rotational speed of the engine suddenly increases.

In the invention, the singular point of the waveform of the AC voltage output by the generator mounted to the engine is detected to detect the specific crank angle position and specify the detection section including the reluctor missing portion according to the number of detections of the specific crank angle position in each detection section. Such a construction allows the detection section including the reluctor missing portion to be specified without using a special position sensor such as a rotary encoder that detects a crank angle position, and thus allows the rotation information detection device that can properly detect information on the reference crank angle position to be obtained without increasing costs.

In a preferable aspect of the invention, there are further provided a phase signal generating circuit that shapes the waveform of the AC voltage generated by the generator, and generates a phase signal that shows a first level during a period when the voltage of the half wave of one polarity of the AC voltage is the threshold value or more, and a second level during other periods, and a waveform shaping circuit that generates a crank angle pulse that keeps a predetermined level between when the pulse signal generator generates each leading edge pulse and when the pulse signal generator generates each trailing edge pulse paired with the leading edge pulse.

In this case, the counting means is comprised so as to count the number of detections of a phase to be detected in the detection section, the detection section being a section between a crank angle position corresponding to any edge of each crank angle pulse generated by the waveform shaping circuit and a crank angle position corresponding to any edge of a next crank angle pulse, and the phase to be detected being at least one of a phase in which the level of the phase signal changes from the first level to the second level and a phase in which the level of the phase signal changes from the second level to the first level. The reference crank angle position identification means is comprised so as to use the difference between the count value counted by the counting means in the detection section including the reluctor missing portion and the count value counted by the counting means in other detection sections to specify the detection section including the reluctor missing portion and identify a pulse generated at the reference crank angle position based on the specified detection section. In this case, a phase relationship between the phase signal and the series of pulses generated by the pulse signal generator is set so that the phase signal shows the first level when the waveform shaping circuit generates each crank angle pulse.

In another preferable aspect of the invention, there are provided abnormality detection means that detects whether an abnormality occurs in a signal system that obtains the phase signal, and abnormal time reference crank angle position identification means that compares lengths of the detection sections successively appearing with rotation of the rotor to specify the detection section including the reluctor missing portion and identify a pulse generated at the reference crank angle position based on the specified detection section, when the abnormality detection means detects the abnormality in the signal system that obtains the phase signal.

The abnormality detection means is preferably comprised so as to determine that there is an abnormality in the signal system that obtains the phase signal when no level change of the phase signal is detected across the plurality of detection sections successively appearing with the rotation of the rotor.

As described above, the lengths of the detection sections successively appearing with the rotation of the rotor are compared to specify the detection section including the reluctor missing portion when the signal system of the phase signal is abnormal, thereby allowing information on the reference crank angle position to be obtained to drive the engine even if an abnormality such as the breaking of a wire occurs in a supply system of the phase signal and no phase signal is provided.

In a further preferable aspect of the invention, the rotation information detection device according to the invention is comprised of the following components.

(a)' A signal generating device including a rotor in which one of n reluctors (n is an integer equal to or more than three) arranged at regular intervals in a rotational direction of a crankshaft of an engine is missed, a total of n-1 reluctors are arranged in the rotational direction, and a portion from which one reluctor is missed is a reluctor missing portion, and a pulse signal generator that detects a leading edge and a trailing edge in the rotational direction of each of the reluctors to generate a leading edge pulse and a trailing edge pulse paired with each other, the pulse signal generator detecting a leading edge or a trailing edge of any reluctor of the rotor to generate a pulse when a crank angle position of the engine matches a reference crank angle position.

(b)' A generator that rotates in synchronization with rotation of the crankshaft to output an n-cycle AC voltage.

(c)' A phase signal generating circuit that shapes a waveform of the AC voltage, and generates a phase signal that shows a first level during a period when a voltage of a half wave of one polarity of the AC voltage is a threshold value or more, and a second level during other periods.

(d)' A waveform shaping circuit that generates a crank angle pulse that keeps a predetermined level between when the pulse signal generator generates each leading edge pulse and when the pulse signal generator generates each trailing edge pulse paired with the leading edge pulse.

(e)' Counting means that counts the number of detections of a phase to be detected in a detection section, the detection section being a section between a crank angle position corresponding to any edge of each crank angle pulse generated by the waveform shaping circuit and a crank angle position corresponding to any edge of a next crank angle pulse, and the phase to be detected being at least one of a phase in which a level of the phase signal changes from a first level to a second level and a phase in which the level of the phase signal changes from the second level to the first level.

(f)' First reference crank angle position identification means that uses a difference between a count value counted by the counting means in a detection section including the reluctor missing portion and a count value counted by the counting means in other detection sections to specify the detection section including the reluctor missing portion and identify a pulse generated at the reference crank angle position based on the specified detection section, before a start of the engine is completed.

(g)' Second reference crank angle position identification means that compares lengths of the detection sections successively appearing with rotation of the rotor to specify the detection section including the reluctor missing portion and identify a pulse generated at the reference crank angle position based on the specified detection section, after the start of the engine is completed.

Also in this case, a phase relationship between the phase signal and the series of pulses generated by the pulse signal generator is set so that the phase signal shows the first level when the waveform shaping circuit generates each crank angle pulse.

As described above, the phase in which the level of the phase signal obtained from the AC voltage output by the generator mounted to the engine changes is used as the phase to be detected (a singular point of a waveform of the AC voltage to be detected) to specify the detection section including the reluctor missing portion according to the number of detections of the phase to be detected in each detection section before the start of the engine is completed, and the lengths of the detection sections successively appearing with the rotation of the rotor are compared without using the phase signal to specify the detection section including the reluctor missing portion after the start of the engine is completed. This allows the detection section including the reluctor missing portion to be specified to obtain information on the reference crank angle position even if a regulator that short-circuits an output of the generator when an output voltage of the generator exceeds a set value after the engine is started is provided to deform the waveform of the output voltage of the generator.

The second reference crank angle position identification means is preferably comprised of specific detection section prediction means that assigns pulse numbers to the series of crank angle pulses obtained from the waveform shaping circuit and predicts the detection section including the reluctor missing portion from the pulse numbers as the specific detection section, and reluctor missing portion checking means that compares lengths of the specific detection section predicted by the specific detection section prediction means and a preceding detection section to check whether the specific detection section includes the reluctor missing portion.

In the invention, rotational direction determination means is preferably further provided that determines that the engine rotates forward when the level of the phase signal is the first level at the time of generation of the leading edge pulse and/or the trailing edge pulse by the pulse signal generator, and determines that the engine rotates in reverse when the level of the phase signal is the second level at the time of generation of the leading edge pulse and/or the trailing edge pulse by the pulse signal generator.

As described above, the rotational direction determination means is provided to allow detection of the reverse rotation of the engine, thereby allowing safety measures to be taken for stopping an ignition operation to prevent the reverse rotation of the engine when the engine is about to rotate in reverse by an insufficient start operation force at the start of the engine.

BRIEF DESCRIPTION OF THE DRAWINGS

The above and other objects and features of the present invention will be apparent from the detailed description of the preferred embodiments of the invention, which is described and illustrated with reference to the accompanying drawings, in which;

FIGS. 5A to 5E are waveform charts of signal waveforms of each part of a detection device according to the invention with respect to a crank angle;

FIGS. 6A to 6D are waveform charts of signal waveforms of each part with respect to a crank angle when an engine rotates in reverse at a start;

FIGS. 7A to 7D are waveform charts of signal waveforms of each part with respect to the crank angle when an output voltage of a generator is adjusted by a regulator;

FIGS. 14A and 14B are waveform charts of signal waveforms of each part of the detection device in FIG. 13;

FIGS. 15A and 15B are waveform charts of signal waveforms when an initial blast of an engine occurs in the conventional detection device at a start of the engine;

FIG. 16 is a schematic front view of a rotor of a generator for illustrating an operation when rotation of the engine changes from forward rotation to reverse rotation in the conventional detection device;

DETAILED DESCRIPTION OF THE PREFERRED EMBODIMENTS

Now, preferred embodiments of the invention will be described with reference to the drawings.

First Embodiment

Figure 1:
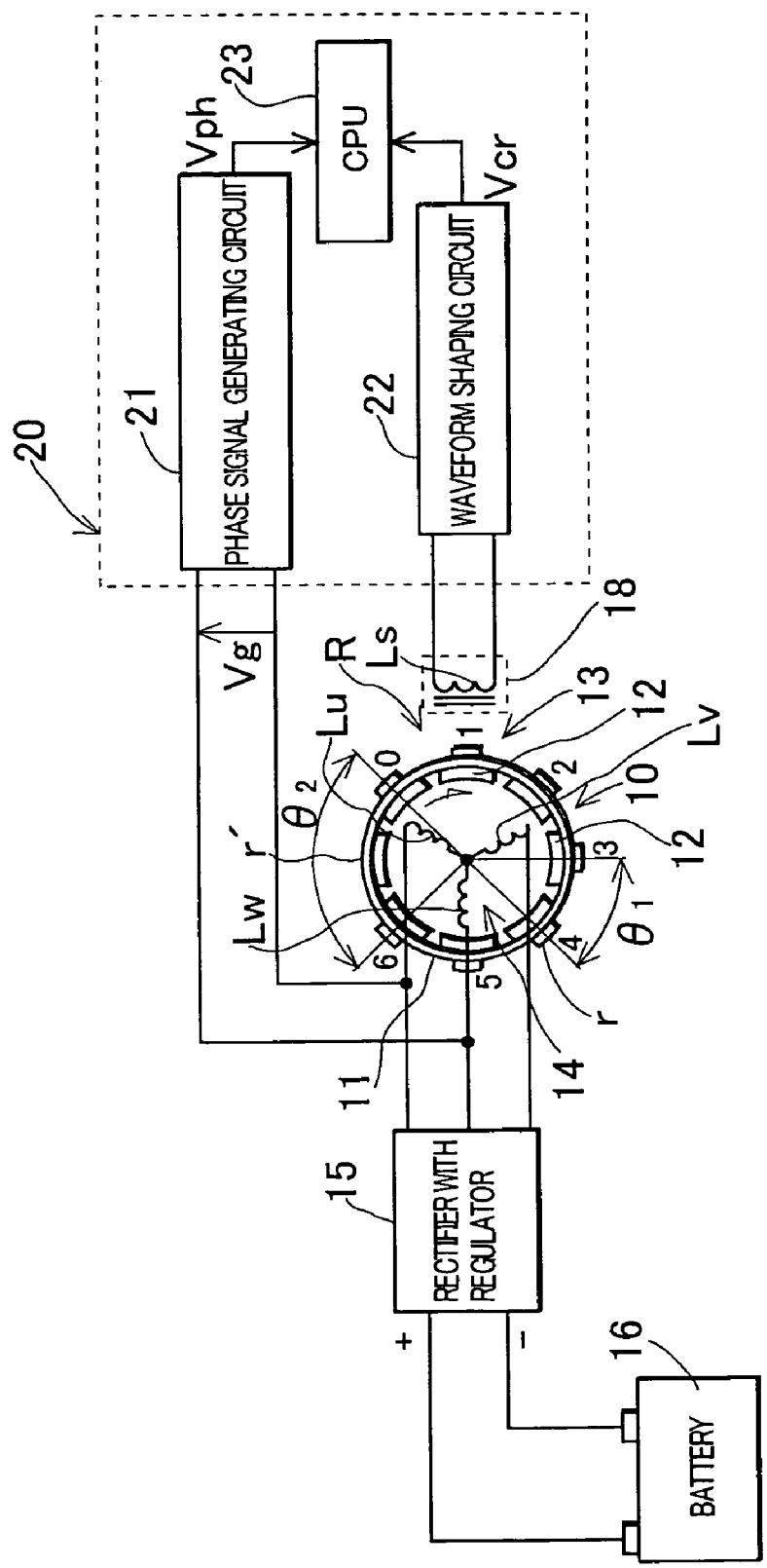
FIG. 1 is a circuit diagram of a construction of hardware used in an embodiment of the invention.

FIG. 1 schematically shows a construction of hardware of a first embodiment of the invention. In FIG. 1, 10 denotes a magneto generator having a rotor mounted to a crankshaft of an engine, and the shown generator is comprised of a magnet rotor 13 with 16 poles and a stator 14 placed inside the magnet rotor 13. The magnet rotor 13 includes a cup-shaped rotor yoke 11 mounted to the crankshaft, and permanent magnets 12 mounted to an inner periphery of a peripheral wall of the rotor yoke 11, and the magnets 12 are polarized with 16 poles to produce a magnetic field with 16 poles. The stator 14 is comprised of an armature core (not shown) with a magnetic pole portion facing magnetic poles of the magnetic field of the magnet rotor, and a three-phase armature coil Lu to Lw wound around the armature core, and secured to a stator mounting portion provided on a casing or a cover or the like of the engine. The generator 10 outputs a three-phase AC voltage from the armature coil Lu to Lw in synchronization with rotation of the engine. The three-phase AC voltage output by the generator 10 is supplied through a rectifier 15 having a regulator to a battery 16, and the battery 16 is charged with the output of the generator 10.

In the shown example, many reluctors r constituted by protrusions (teeth) are formed on an outer periphery of the rotor yoke 11, and a rotor R of a signal generating device is comprised of the rotor yoke 11 and the reluctors r formed on the outer periphery of the rotor yoke 11. The shown rotor R has a construction in which one of eight reluctors arranged at regular angular intervals in a rotational direction of the crankshaft of the engine is removed, and a total of seven reluctors are arranged in the rotational speed, and a portion from which one reluctor is removed is a reluctor missing portion r'. In order to identify the seven reluctors r, numbers from 0 to 6 are assigned to the seven reluctors as shown.

18 denotes a pulse signal generator that detects an edge of each of the seven reluctors provided on the rotor R to generate a pulse, and the pulse signal generator outputs a leading edge pulse Vs1 and a trailing edge pulse Vs2 paired with each other when detecting a leading edge and a trailing edge in the rotational speed of each reluctor r as shown in FIG. 5A. Such a pulse signal generator includes a signal coil Ls wound around a core having on a tip thereof a magnetic pole portion facing the reluctor, and a permanent magnet magnetically connected to the core around which the signal coil is wound, and generates pulses with different polarities when detecting the leading edge and the trailing edge in the rotational speed of the reluctor. In the shown example, the signal coil Ls is wound so that the pulse signal generator 18 generates a positive pulse Vs1 when detecting the leading edge in the rotational direction of each reluctor, and the pulse signal generator 18 generates a negative pulse Vs2 when detecting the trailing edge in the rotational direction of each reluctor.

The signal generating device is comprised of the rotor R comprised of the rotor yoke 11 and the reluctors r formed on the outer periphery of the rotor yoke 11, and the pulse signal generator 18. In the signal generating device used in the invention, a position to which the pulse signal generator 18 is mounted is set so that the pulse signal generator 18 detects an edge of any reluctor of the rotor R to generate a pulse when a crank angle position of the engine matches a reference crank angle position. The reference crank angle position has a fixed phase relationship with the reluctor missing portion r' of the rotor R, and thus the reference crank angle position can be recognized by specifying the reluctor missing portion r'. The reference crank angle position may be a position at which an edge of any reluctor is detected, but in descriptions below, the reference crank angle position is a crank angle position when the pulse signal generator 18 detects the leading edge in the rotational direction of the number 6 reluctor r to generate a leading edge pulse Vs1.

A reference numeral 20 denotes a signal processing unit that performs an arithmetical operation for detecting the reluctor missing portion r' of the rotor R of the signal generating device to detect the reference crank angle position. The signal processing unit is comprised of a phase signal generating circuit 21 that shapes a waveform of a single-phase AC voltage Vg taken out of the armature coil (the U-phase coil Lu and the W-phase coil Lw in the shown example) of the generator 10, and generates a phase signal Vph that shows a first level during a period when a voltage of a half wave of one polarity of the AC voltage is a threshold value Vt' or more, and a second level during other periods, a waveform shaping circuit 22 that uses a pulse output by the pulse signal generator as an input and generates a crank angle pulse Vcr that keeps a predetermined level between when the leading edge pulse Vs1 is generated and when the trailing edge pulse Vs2 paired with the leading edge pulse Vs1 is generated, and a CPU (microcomputer) 23 to which the phase signal Vph and the crank angle pulse Vcr are input.

Waveforms of the pulses Vs1 and Vs2 output by the pulse signal generator 18, a waveform of the crank angle pulse Vcr output by the waveform shaping circuit 22, the waveform of the AC voltage Vg obtained from the generator 10, and a waveform of the phase signal Vph obtained from the phase signal generating circuit 21 are shown in FIGS. 5A, 5B, 5D and 5E, respectively. In FIGS. 5A and 5B, waveforms shown by broken lines show a waveform of a pulse and a waveform of a crank angle pulse that would be generated if no reluctor missing portion were provided, and are not generated in practice. In FIGS. 5A to 5E, a crank angle θ is taken as a horizontal axis.

The crank angle pulse Vcr shown in FIG. 5B is a pulse that shows an H level (a high level) in a section between a crank angle position where the pulse Vs1 generated by the pulse signal generator 3 reaches a threshold value Vt and a crank angle position where the pulse Vs2 reaches the threshold value Vt, and an L level (a low level) in other sections. The phase signal Vph in FIG. 5E is a rectangular wave signal that shows the first level (an H level in the shown example) between a crank angle position where the voltage of the half wave of one polarity of the AC voltage Vg obtained by the generator reaches the threshold value Vt' or more and a crank angle position where the voltage reaches the threshold value Vt' or less, and a second level (an L level in the shown example) in other sections.

Figure 2:
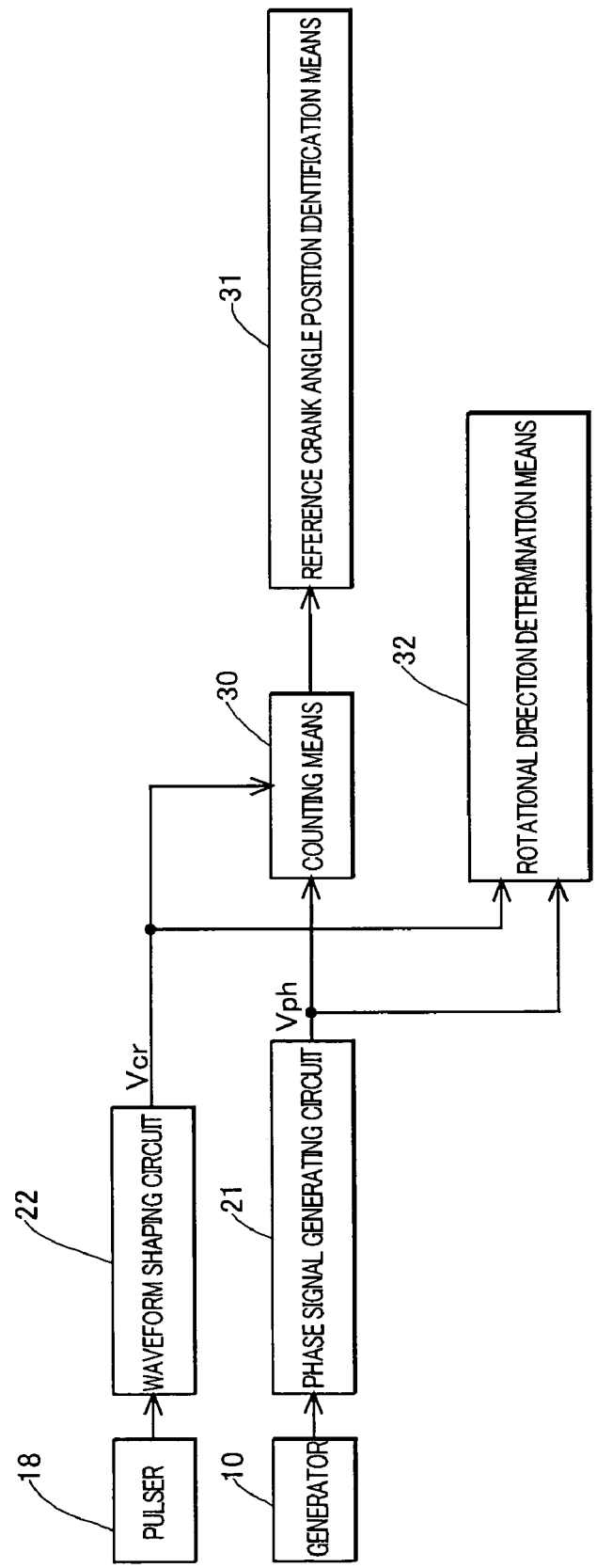
FIG. 2 is a block diagram of an entire construction of a first embodiment of the invention.

In the first embodiment of the invention, the predetermined program is executed by the CPU 23 to construct counting means 30 that counts the number of detections of a singular point of a waveform of the AC voltage in each detection section, as shown FIG. 2, the detection section being a section between a crank angle position where the pulse signal generator 3 detects an edge of each reluctor r to generate a pulse and a crank angle position where the pulse signal generator 3 detects a next reluctor to generate a pulse, reference crank angle position identification means 31 that uses a difference between a count value counted by the counting means 30 in a detection section including the reluctor missing portion and a count value counted by the counting means 30 in other detection sections to specify the detection section including the reluctor missing portion and identify a pulse generated at the reference crank angle position based on the specified detection section, and rotational direction determination means 32 that determines that the engine rotates forward when the level of the phase signal is the first level (in this example, the H level) at the time of generation of the leading edge pulse Vs1 and/or the trailing edge pulse Vs2 by the pulse signal generator 3, and determines that the engine rotates in reverse when the level of the phase signal is the second level at the time of generation of the leading edge pulse Vs1 and/or the trailing edge pulse Vs2 by the pulse signal generator 3.

The detection section may be the section between the crank angle position where the pulse signal generator 3 detects an edge of each reluctor r to generate a pulse and the crank angle position where the pulse signal generator 3 detects a next reluctor to generate a pulse, and any of the following sections may be used as the detection section.

a. A section between a generation position of each leading edge pulse Vs1 and a generation position of a next leading edge pulse Vs1 (a section between a rising edge of each crank angle pulse Vcr and a rising edge of a next crank angle pulse Vcr).

b. A section between a generation position of each leading edge pulse Vs1 and a generation position of a next trailing edge pulse Vs2 (a section between a rising edge of each crank angle pulse Vcr and a falling edge of a next crank angle pulse Vcr).

c. A section between a generation position of each trailing edge pulse Vs2 and a generation position of a next leading edge pulse Vs1 (a section between a falling edge of each crank angle pulse Vcr and a rising edge of a next crank angle pulse Vcr).

d. A section between a generation position of each trailing edge pulse Vs2 and a generation position of a next trailing edge pulse Vs2 (a section between a falling edge of each crank angle pulse Vcr and a falling edge of a next crank angle pulse Vcr).

Herein, the number of detections of a phase to be detected while the crankshaft rotates in a detection section θd is counted by the counting means 30, the detection section being the section θd between the generation position of each leading edge pulse Vs1 and the generation position of the next leading edge pulse Vs1 (the section between the rising edge of each crank angle pulse Vcr and the rising edge of the next crank angle pulse Vcr), and the phase to be detected being the rising edge of the phase signal Vph.

When the waveform shaping circuit 22 and the phase signal generating circuit 21 as described above are provided, the counting means 30 is comprised so as to count the number of detections of a phase to be detected in the detection section, the detection section θd being a section between a crank angle position corresponding to any edge of each crank angle pulse generated by the waveform shaping circuit 22 and a crank angle position corresponding to any edge of a next crank angle pulse, and the phase to be detected being at least one of a phase in which the level of the phase signal Vph changes from the first level to the second level and a phase in which the level of the phase signal changes from the second level to the first level.

Changes in count values MAGUPCNT obtained by the counting means 30 are shown in FIG. 5C. As is apparent from FIG. 5C, a count value MAGUPCNT counted by the counting means 30 in a detection section θd including no reluctor missing portion r' is "1", but a count value MAGUPCNT counted by the counting means 30 in a detection section θd including a reluctor missing portion r' is "2".

Thus, the count value of the counting means 30 is different between the detection section θd including the reluctor missing portion and the detection section including no reluctor missing portion, and thus the detection section θd including the reluctor missing portion can be specified by the difference in the count values. The detection section including the reluctor missing portion can be thus specified, thereby allowing identification of a pulse generated by the pulse signal generator at a reference crank angle position having a fixed phase relationship with the detection section. In the embodiment, when the detection section θd including the reluctor missing portion r' is specified, a number 6 is assigned to a crank angle pulse Vcr generated at an end position of the detection section, and numbers 5, 4, 3, 2, 1 and 0 are assigned to crank angle pulses Vcr successively generated to identify each crank angle pulse. The numbers are thus assigned to the crank angle pulses for identification to allow specification of crank angle positions of a rising edge (a generation position of a leading edge pulse) and a falling edge (a generation position of a trailing edge pulse) of each crank angle pulse. In the embodiment, the number 6 leading edge pulse Vs1 is recognized as a reference pulse, and a generation position of the reference pulse is recognized as a reference crank angle position.

The above description is an example, and a relationship between a position where the pulse signal generator generates each pulse and a crank angle position of the engine can be set so that any pulse other than the number 6 leading edge pulse is a reference pulse.

As described above, the difference between the count value counted by the counting means 30 in the detection section θd including the reluctor missing portion and the count value counted by the counting means 30 in other detection sections θd is used to specify the detection section including the reluctor missing portion, thereby allowing the detection section including the reluctor missing portion to be properly specified to identify the pulse generated at the reference crank angle position, even if an initial blast of the engine occurs at a start of the engine and a rotational speed of the engine suddenly increases.

As described above, in the case where the signal generating device and the phase signal generating circuit are provided, the levels of the phase signals at the time of generation of the leading edge pulse Vs1 (when the rising edge of the crank angle pulse is detected) and the trailing edge pulse Vs2 (when the falling edge of the crank angle pulse is detected) by the pulse signal generator 3 are both the first level (in this example, the H level) when the engine rotates forward as shown in FIG. 5. On the other hand, when the engine rotates in reverse, the levels of the phase signals at the time of generation of the leading edge pulse Vs1 and the trailing edge pulse Vs2 by the pulse signal generator 3 are both the second level (in this example, the L level) as shown in the right half of FIG. 6. Thus, it can be determined that the engine rotates forward when the level of the phase signal is the first level (in this example, the H level) at the time of generation of the leading edge pulse Vs1 and/or the trailing edge pulse Vs2 by the pulse signal generator 3, and it can be determined that the engine rotates in reverse when the level of the phase signal is the second level at the time of generation of the leading edge pulse Vs1 and/or the trailing edge pulse Vs2 by the pulse signal generator 3.

Thus, the rotational direction determination means is provided to allow detection of the reverse rotation of the engine, thereby allowing detection of the reverse rotation of the engine to stop an ignition operation when the engine is about to rotate in reverse to prevent the reverse rotation of the engine.

Second Embodiment

Figure 3:
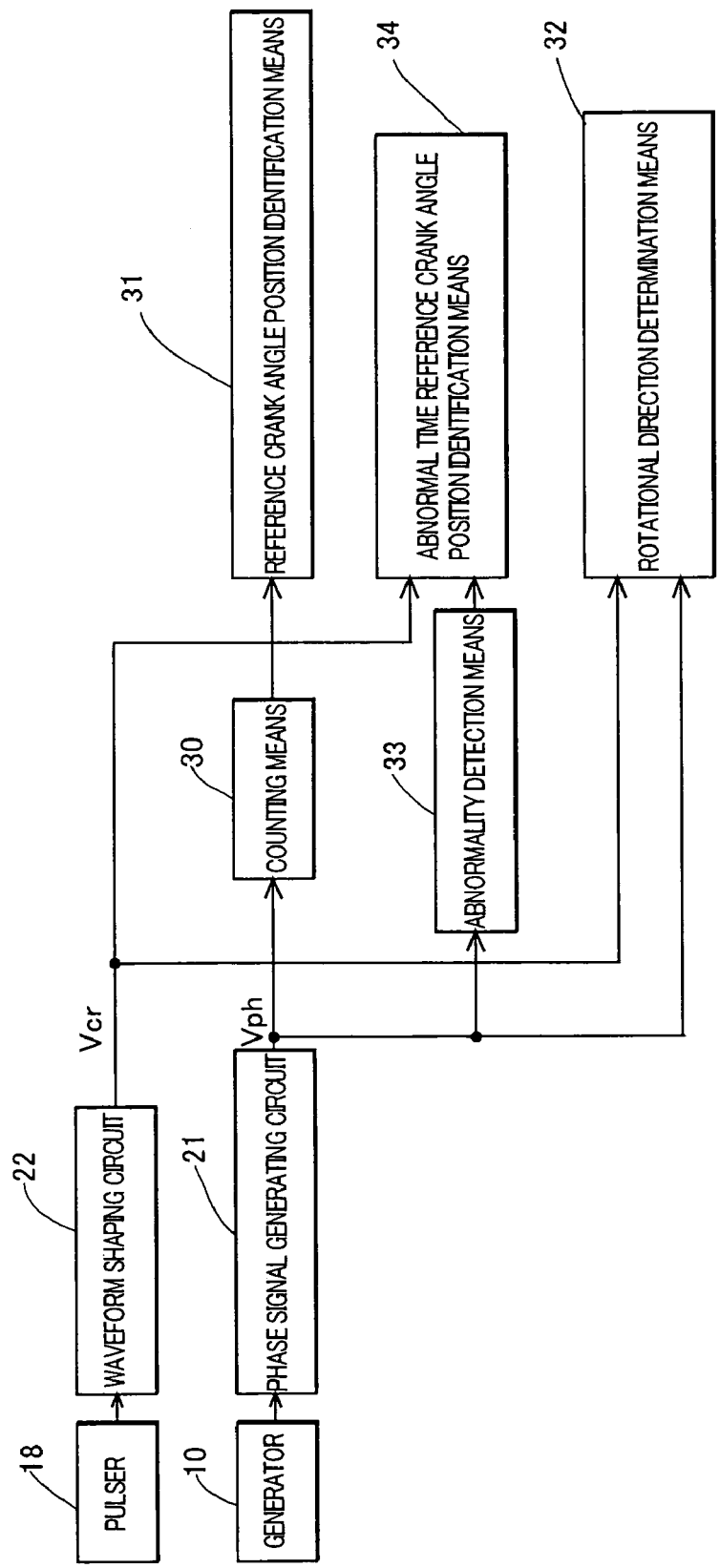
FIG. 3 is a block diagram of an entire construction of a second embodiment of the invention.

In a second embodiment of the invention, as shown in FIG. 3, there are provided abnormality detection means 33 that detects whether an abnormality occurs in a signal system that obtains the phase signal Vph, and abnormal time reference crank angle position identification means 34 that compares lengths of detection sections θd successively appearing with rotation of a rotor to specify a detection section including a reluctor missing portion and identify a pulse generated at a reference crank angle position based on the specified detection section when the abnormality detection means 33 detects the abnormality in the signal system that obtains the phase signal. Other points are the same as the embodiment in FIG. 2.

The abnormality detection means 33 is comprised so as to determine that there is an abnormality in the signal system that obtains the phase signal Vph when no level change of the phase signal Vph is detected across the plurality of detection sections θd successively appearing with rotation of the rotor.

When the breaking of a wire or the like prevents the phase signal Vph from being obtained, the counting means 30 cannot count the number of appearances of a phase to be detected (a singular point of the AC voltage), and thus the reference crank angle position identification means 31 cannot specify the detection section θd including the reluctor missing portion r' and cannot identify the reference crank angle position. Thus, in the embodiment, the abnormality detection means 33 and the abnormal time reference crank angle position identification means 34 are provided, and when the abnormality detection means 33 detects the abnormality in the signal system that obtains the phase signal, the abnormal time reference crank angle position identification means 34 compares the lengths of the detection sections θd successively appearing with the rotation of the rotor to specify the detection section including the reluctor missing portion and identify the pulse generated at the reference crank angle position based on the specified detection section. Such a construction allows information on the reference crank angle position to be obtained to normally control the engine even when an abnormality occurs in the signal system of the phase signal.

Third Embodiment

Figure 4:
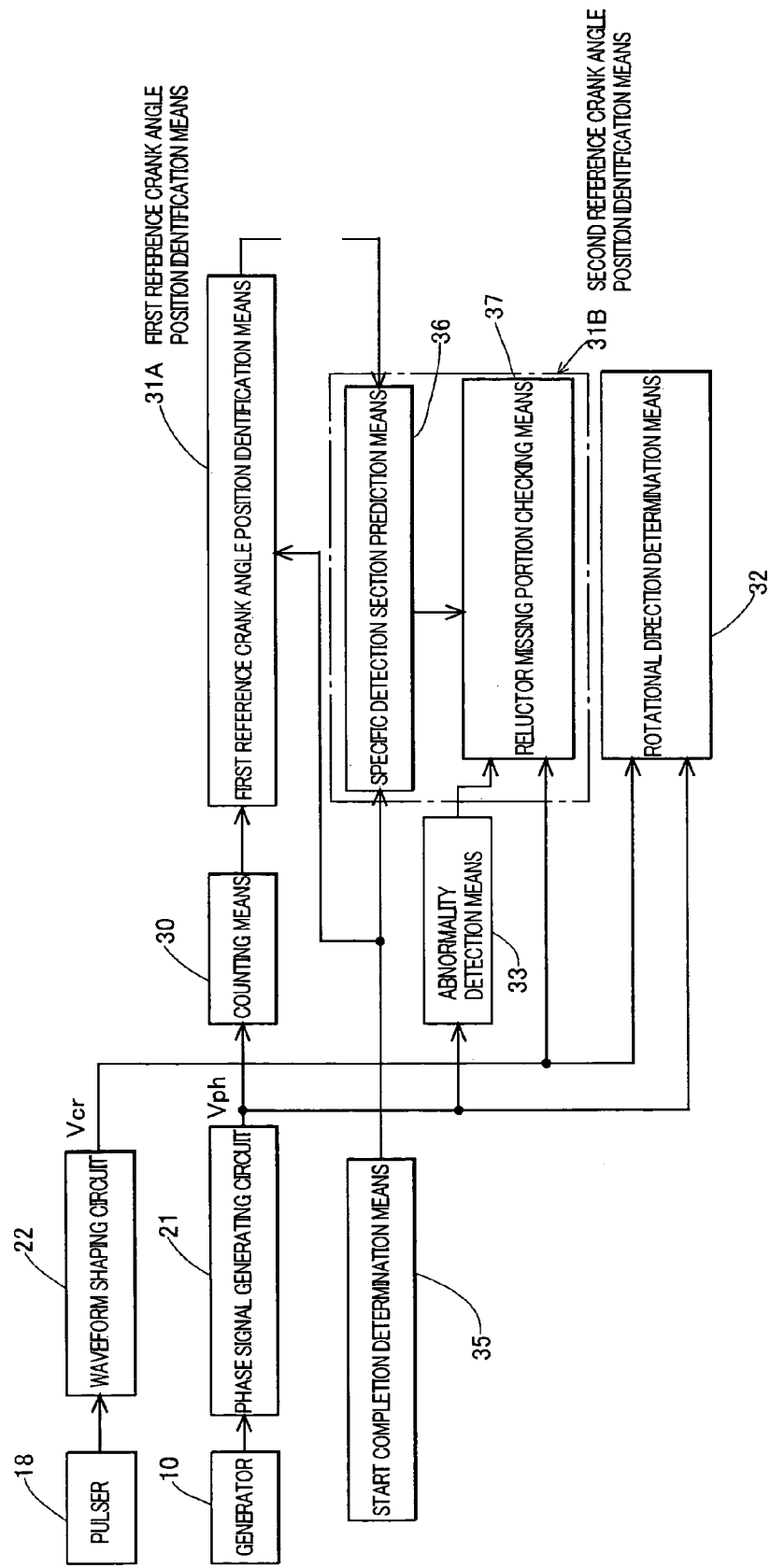
FIG. 4 is a block diagram of an entire construction of a third embodiment of the invention.

In a third embodiment of the invention, a predetermined program is executed by a CPU to construct counting means 30, start completion determination means 35, first reference crank angle position identification means 31A, second reference crank angle position identification means 31B, and rotational direction determination means 32 as shown in FIG. 4.

The counting means 30 counts the number of detections of a phase to be detected in a detection section θd, the detection section being a section between a crank angle position corresponding to any edge of each crank angle pulse generated by the waveform shaping circuit 22 and a crank angle position corresponding to any edge of a next crank angle pulse, and the phase to be detected being at least one of a phase in which the level of the phase signal Vph changes from the first level to the second level and a phase in which the level of the phase signal Vph changes from the second level to the first level.

The start completion determination means 35 determines whether the start of the engine is completed.

The first reference crank angle position identification means 31A uses a difference between a count value counted by the counting means 30 in a detection section including a reluctor missing portion and a count value counted by the counting means 30 in other detection sections to specify the detection section including the reluctor missing portion and identify a pulse generated at a reference crank angle position based on the specified detection section, before the start of the engine is completed.

The second reference crank angle position identification means 31B compares lengths of the detection sections successively appearing with the rotation of the rotor to specify the detection section including the reluctor missing portion and identify a pulse generated at the reference crank angle position based on the specified detection section, after the start of the engine is completed.

A construction of the rotational direction determination means 32 is the same as in the first embodiment.

Also in this case, a phase relationship between the phase signal and the series of pulses generated by the pulse signal generator is set so that the phase signal shows the first level when the waveform shaping circuit 22 generates each crank angle pulse.

In the example in FIG. 4, the second reference crank angle position identification means 31B is comprised of specific detection section prediction means 36 that assigns pulse numbers to the series of crank angle pulses obtained from the waveform shaping circuit 22 and predicts the detection section including the reluctor missing portion from the pulse numbers as a specific detection section, and reluctor missing portion checking means 37 that compares lengths of the specific detection section predicted by the specific detection section prediction means and a preceding detection section to check whether the specific detection section includes the reluctor missing portion.

In the embodiment in FIG. 4, the phase in which the level of the phase signal obtained from the AC voltage output by the generator mounted to the engine changes is used as the phase to be detected (a singular point of a waveform of the AC voltage) to specify the detection section including the reluctor missing portion according to the number of detections of the phase to be detected in each detection section before the start of the engine is completed.

After the start of the engine is completed, the lengths of the detection sections successively appearing with the rotation of the rotor are compared without using the phase signal to specify the detection section including the reluctor missing portion.

Generally, a generator mounted to an engine is used for charging a battery or a driving other loads. In a generator driven by an engine, however, an output voltage thereof increases with an increase in a rotational speed of the engine to be excessive for the loads, and thus a regulator (a voltage regulator) is provided to adjust the output voltage of the generator. In the case where the generator 10 is a magneto generator as in the embodiment, a short circuit type regulator that short-circuits an output of the generator when the output voltage of the generator becomes excessive is often used. In the case where such a short circuit type regulator is provided, a waveform of the AC voltage Vg of the generator is significantly deformed as a waveform of a third cycle or after in FIG. 7C in operation of the regulator (in a short circuit) when the start of the engine is completed and the regulator starts to operate. This causes changes in signal widths of a phase signal Vph in FIG. 7D, and prevents using a method for specifying a detection section including a reluctor missing portion according to the number of detections of a phase to be detected in each detection section with the phase in which the level of the phase signal Vph changes being used as the phase to be detected (the a singular point of the waveform of the AC voltage).

On the other hand, in a state where the start of the engine is completed and a rotational speed thereof increases to some extent, the crankshaft rotates with a constant speed, and there is no possibility of misidentifying a reluctor missing portion even if a method for specifying the detection section including the reluctor missing portion according to the lengths of the detection sections is used similarly to the method used in the related art. Therefore, the detection of the reluctor missing portion after the start of the engine is confirmed is performed by comparing the lengths of the detection sections successively appearing with the rotation of the rotor similarly to the related art without using the phase signal.

Such a construction allows the detection section including the reluctor missing portion to be specified to obtain information on the reference crank angle position even if a regulator that short-circuits an output of the generator when an output voltage of the generator exceeds a set value after the engine is started is provided to deform the waveform of the output voltage of the generator.

However, determination of the lengths of all the detection sections is performed during the driving of the engine, an increased load is applied to the CPU to reduce time used for other arithmetical operations necessary for driving the engine such as an arithmetical operation of an ignition position or an arithmetical operation of a fuel injection time. Thus, in the embodiment, the second reference crank angle position identification means 31B is comprised of the specific detection section prediction means 36 and the reluctor missing portion checking means 37.

The specific detection section prediction means 36 assigns pulse numbers to the series of crank angle pulses obtained from the waveform shaping circuit and predicts the detection section including the reluctor missing portion from the pulse numbers as the specific detection section. In this example, based on the detection section including the reluctor missing portion specified by the first reference crank angle position identification means 31A, the specific detection section prediction means 36 assigns pulse numbers from 0 to 6 to the series of pulses generated by the pulse signal generator 3 to identify a series of crank angle pulses, and predicts the detection section after the crank angle pulse Vcr of the pulse number 0 is generated as the specific detection section including the reluctor missing portion. The reluctor missing portion checking means 37 compares lengths of the predicted specific detection section and a preceding detection section to check whether the specific detection section includes the reluctor missing portion (whether the prediction is correct).

The detection section that should include the reluctor missing portion is thus predicted to merely check whether the prediction is correct, thereby reducing the load applied to the CPU as compared with the case where the lengths of all the detection sections and the preceding detection sections are compared, and increasing time for arithmetical operations necessary for other controls such as ignition control or fuel injection control.

Figure 9:
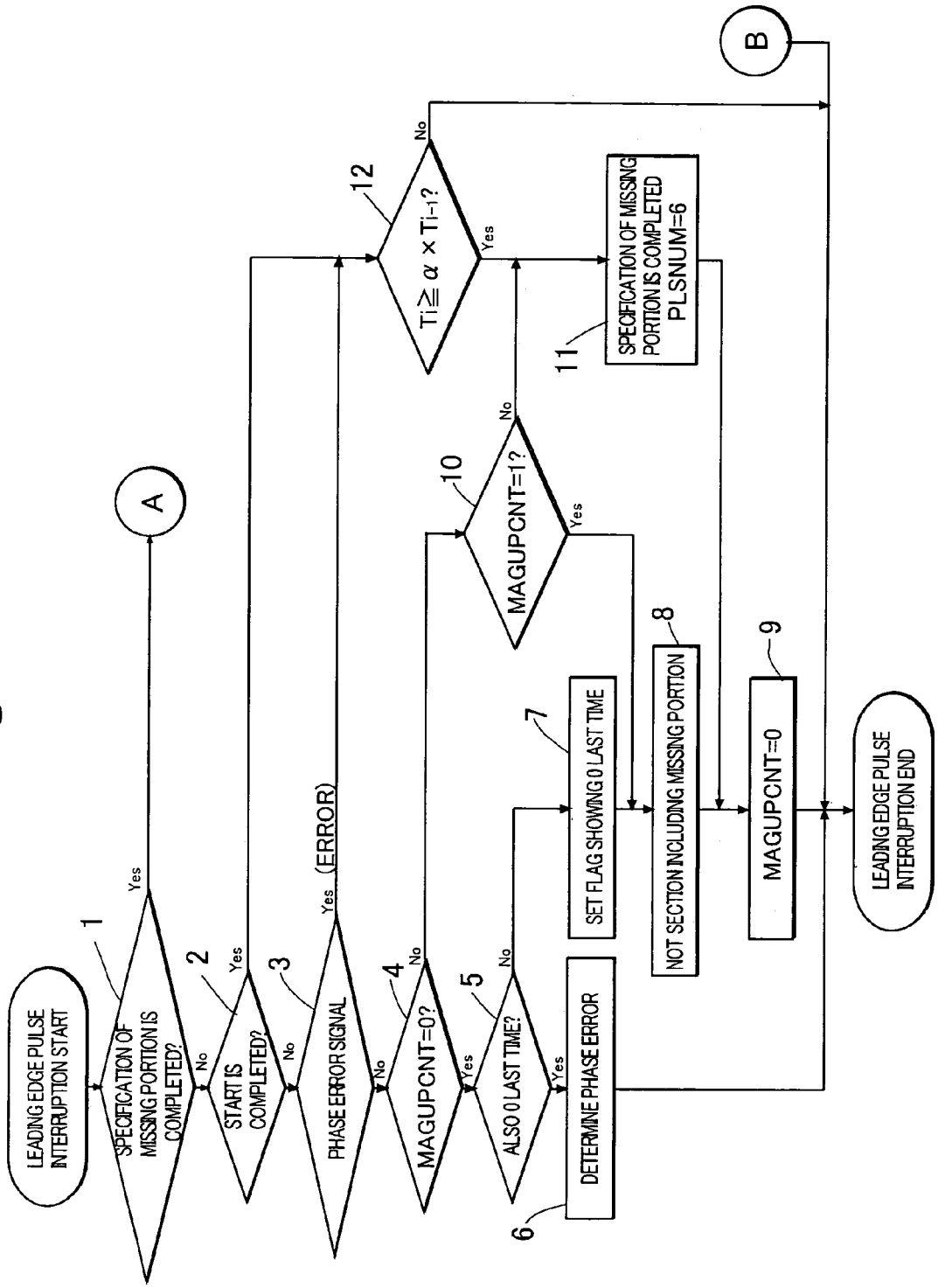
FIG. 9 is a part of a flowchart showing an algorithm of a program executed by a CPU in the embodiment in FIG. 4.
Figure 10:
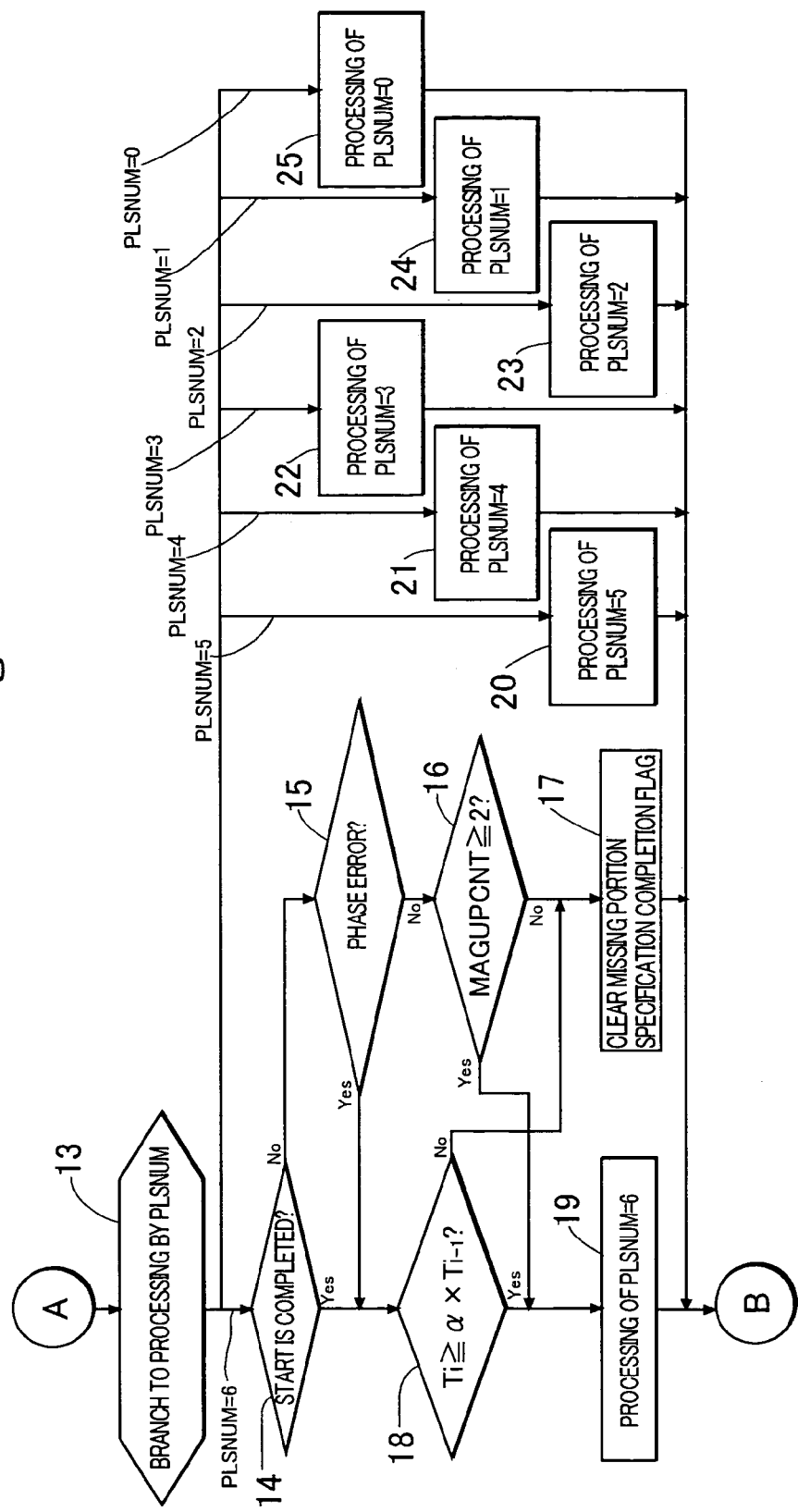
FIG. 10 is the other part of the flowchart showing the algorithm of the program executed by the CPU in the embodiment in FIG. 4.
Figure 11:
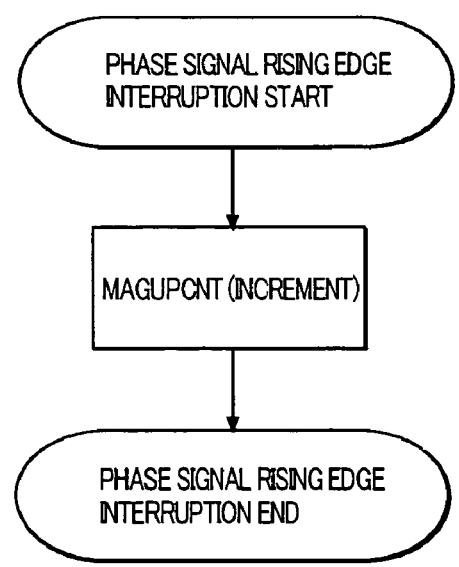
FIG. 11 is a flowchart showing an algorithm of an interruption routine executed by the CPU for constructing counting means in the embodiment in FIG. 4.
Figure 13:
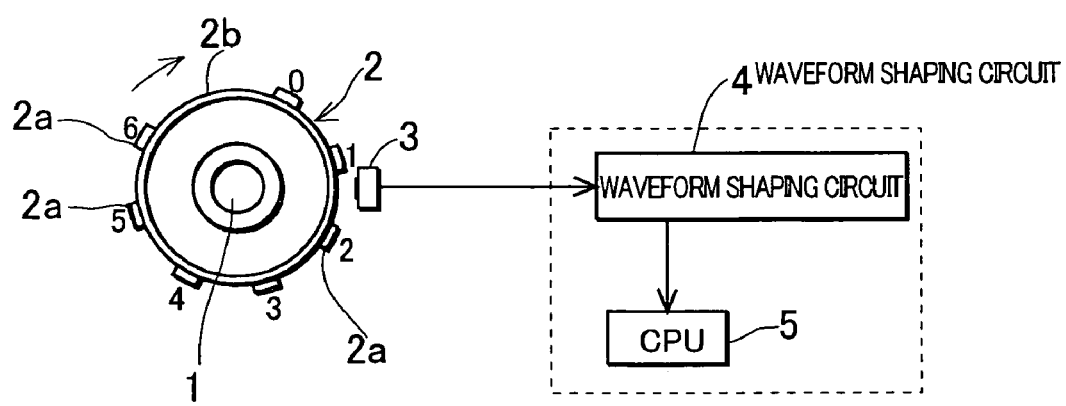
FIG. 13 is a circuit diagram of a construction of hardware used in a conventional detection device.

FIGS. 9 to 11 are flowcharts of an algorithm of a program executed by the CPU for constructing function realizing means other than the rotational direction determination means 32 in the embodiment in FIG. 4. FIGS. 9 and 10 show a leading edge interruption routine executed every time the pulse signal generator generates a leading edge pulse, and FIG. 11 shows a phase signal rising edge interruption routine executed when the rising edge of the phase signal is recognized.

Every time the rising edge of the phase signal Vph is detected, the interruption routine in FIG. 11 is executed to increment a count value MAGUPCNT by 1.

Every time the pulse signal generator generates the leading edge pulse Vs1 to generate the crank angle pulse Vcr, the interruption routine shown in FIGS. 9 and 10 is executed. In this routine, Step 1 in FIG. 9 is first performed to determine whether the specification of the detection section including the reluctor missing portion is completed. When it is determined that the specification of the detection section including the reluctor missing portion is not completed, the process proceeds to Step 2 to determine whether the start of the engine is completed. The determination whether the start of the engine is completed can be performed by comparing the rotational speed of the engine and a predetermined determination speed. Specifically, when it is detected that the rotational speed of the engine is the determination speed or higher, it can be determined that the start of the engine is completed.

When it is determined in Step 2 that the start of the engine is not completed, the process proceeds to Step 3 to determine whether a phase error signal showing that no phase signal is provided from the generator through the phase signal generating circuit. When it is determined that the error signal is not generated, the process proceeds to step 4 to determine whether the count value MAGUPCNT by the counting means is 0. When it is determined in Step 4 that the MAGUPCNT is 0, the process proceeds to Step 5 to determine whether the MAGUPCNT is also 0 when this routine is executed last time. When it is determined that the MAGUPCNT is also 0 last time, the process moves to Step 6 to determine that the phase signal is abnormal (phase error determination) and generate the phase error signal, and then finish the routine. When it is determined in Step 5 that the MAGUPCNT is not 0 last time, the process proceeds to Step 7 to set a flag showing that the MAGUPCNT is 0 last time (last time when the routine is next executed), and then it is determined in Step 8 that the current detection section does not include the reluctor missing portion, and the count value MAGUPCNT is set to 0 in Step 9 to finish the routine.

When it is determined in Step 4 that the count value MAGUPCNT is not 0, the process proceeds to Step 10 to determine whether the count value MAGUPCNT is 1. When it is determined that the MAGUPCNT is 1, the process moves to Step 8. When it is determined in Step 10 that the MAGUPCNT is not 1, the process proceeds to Step 11 to determine an immediately preceding detection section (a detection section that ends when a rising edge of the crank angle pulse Vcr with the pulse number 6, that is, the number 6 leading edge pulse is generated) as the section including the reluctor missing portion and complete the specification of the detection section including the reluctor missing portion, and after a pulse number PLSNUM assigned to the crank angle pulse Vp generated during the execution of the interruption routine is set to 6, the process moves to Step 9 where the count value MAGUPCNT is reset to 0.

When it is determined in Step 3 that the phase error signal is generated (there is an abnormality in the signal system of the phase signal), the process proceeds to Step 12 to compare time Ti required for the crankshaft to rotate in the current detection section with time Ti-1 required for the crankshaft to rotate in the preceding detection section multiplied by a recognition constant α. When it is determined that Ti is equal to or larger than α Ti-1, the process moves to Step 11 to complete the specification of the detection section including the reluctor missing portion, and the pulse number PLSNUM is set to 6 to finish the routine. When it is determined that Ti is not equal to or larger than α Ti-1, no operation is performed thereafter to finish the routine.

The times Ti and Ti-1 required for the crankshaft to rotate in the detection section can be calculated by reading a count value of a timer at a start position and an end position of the detection section. The time calculated when the pulse with the pulse number 0 is generated is stored in a memory as the time Ti-1.

In Step 1 in FIG. 9, when it is determined that the specification of the detection section including the reluctor missing portion is completed, the process moves to Step 13 in FIG. 10 for branching by the pulse number PLSNUM. In the branching, when the pulse number PLSNUM is 6, the process proceeds to Step 14 to determine whether the start of the engine is completed. When it is determined that the start of the engine is not completed, the process proceeds to Step 15 to determine whether the phase error signal is generated. When it is determined that the phase error signal is not generated, the process proceeds to Step 16 to determine whether the count value MAGUPCNT is 2 or more. When it is determined that the count value MAGUPCNT is not 2 or more, the process proceeds to Step 17 to clear a missing portion specification completion flag and finish the routine. When it is determined in Step 14 that the start of the engine is completed and it is determined in Step 15 that the phase error signal is generated, the process proceeds to Step 18 to compare the time Ti required for the crankshaft to rotate in the current detection section with the time Ti-1 required for the crankshaft to rotate in the preceding detection section multiplied by the recognition constant α. When it is determined that Ti is equal to or larger than α Ti-1, the process proceeds to Step 19 to perform processing required when the pulse with the pulse number PLSNUM of 6 is generated (such as setting an ignition timer or setting an injection timer when the generation position of the pulse with the pulse number 6 is a reference crank angle position), and then finish the routine. When it is determined in Step 16 that the count value MAGUPCNT is 2 or more, the process also proceeds to Step 19 to perform processing required when the pulse with the pulse number PLSNUM of 6 is generated, and then finish the routine.

In Step 13 in FIG. 10, when it is determined that the pulse number PLSNUM of the pulse generated at the current interruption start is 5, the process proceeds to Step 20 to perform processing required when the pulse with the pulse number PLSNUM of 5 is generated, and then finish the interruption routine. When it is determined in Step 13 that the pulse number PLSNUM of the pulse generated at the current interruption start is 4, the process proceeds to Step 21 to perform processing required when the pulse with the pulse number PLSNUM of 4 is generated, and then finish the interruption routine. Similarly, when it is determined in Step 13 that the pulse numbers are 3, 2, 1 and 0, the process proceeds to Steps 22, 23, 24 and 25 to perform processing required when the pulses with the pulse numbers PLSNUM of 3, 2, 1 and 0 are generated, and then finish the interruption routine.

According to the algorithms in FIGS. 9 to 11, the start completion determination means 35 is constructed by Step 2 in FIG. 9 and Step 14 in FIG. 10, and the counting means 30 is constructed by the interruption routing in FIG. 11. Further, the first reference crank angle position identification means 31A is constructed by Steps 4, 5, 7, 8, 10 and 12 in FIG. 9 and Steps 16 and 19 in FIG. 10, and the abnormality detection means 33 is constructed by Steps 3, 4, 5 and 6 in FIG. 9 and Step 15 in FIG. 10. The specific detection section prediction means 36 is constructed by the process moving to Step 14 when the pulse number is 6 in Step 13 in FIG. 10, and the reluctor missing portion checking means 37 is constructed by Steps 18 and 19 in FIG. 10.

Figure 12:
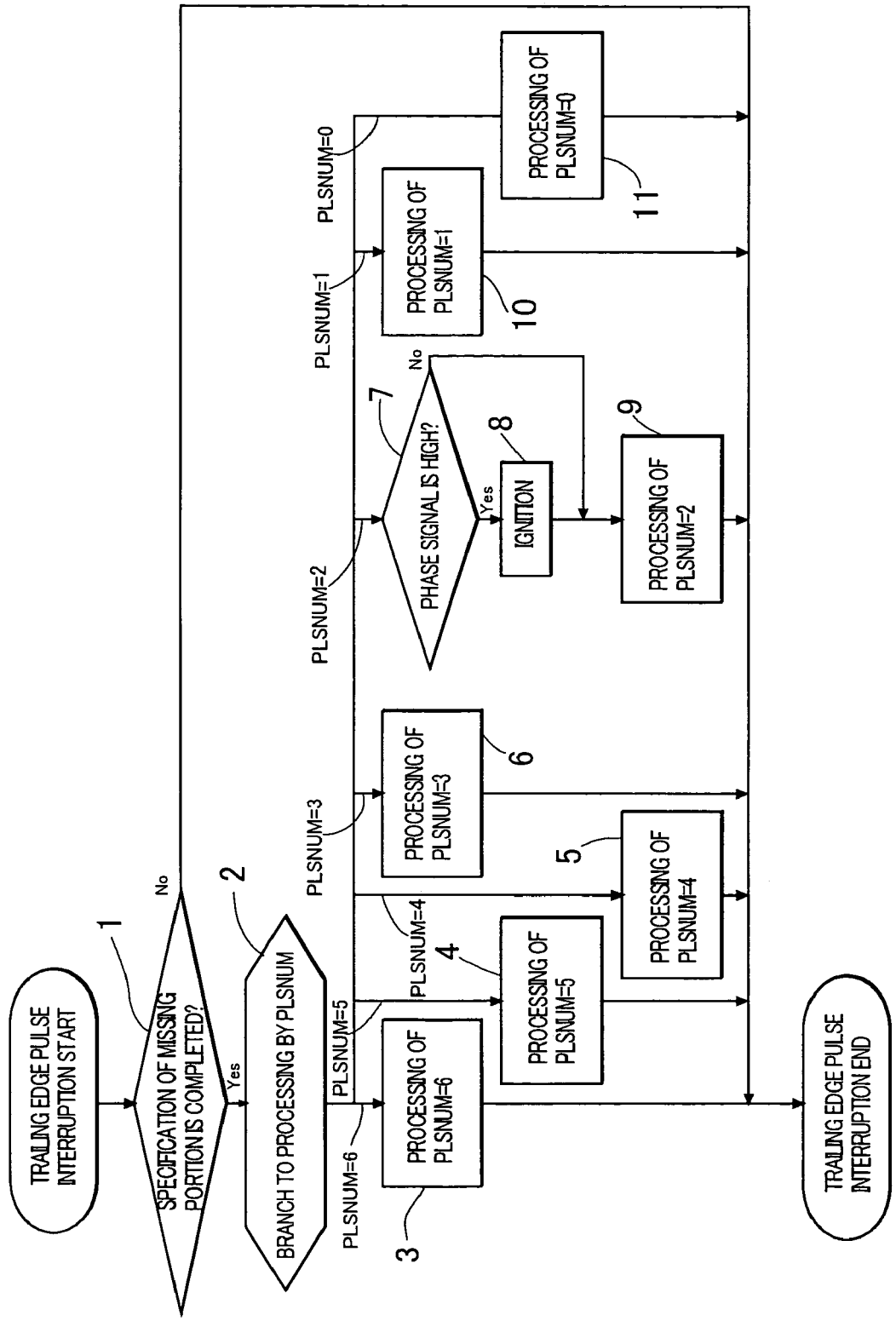
FIG. 12 is a flowchart showing an algorithm of a program executed by the CPU for constructing rotational direction determination means and means for controlling ignition of the engine according to a determination result by the rotational direction determination means in the embodiment in FIG. 4.
Figure 17A:
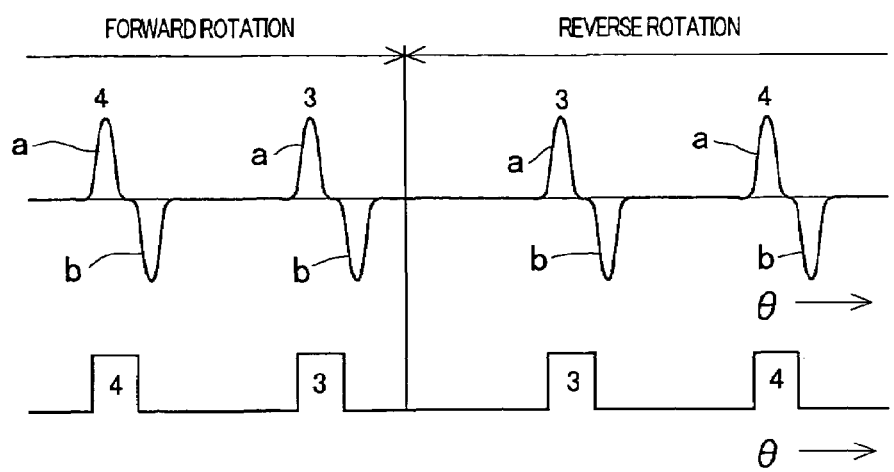
FIGS. 17A and 17B are waveform charts of signal waveforms when the engine rotates in reverse in the conventional detection device.
Figure 17B:

FIG. 12 is a flowchart of an algorithm of a program executed by the CPU for constructing the rotational direction determination means 32 and when ignition of the engine is prevented when the determination means determines that the engine rotates in reverse in the embodiment in FIG. 4. FIG. 12 shows a trailing edge pulse interruption routine executed every time the pulse signal generator generates a trailing edge pulse Vs2 (every time the rising edge of the crank angle pulse Vcr is recognized). In Step 1 of this routine, it is determined whether the specification of the detection section including the reluctor missing portion is completed, and when it is determined that the specification is not completed, no operation is performed thereafter to finish the routine. When it is determined in Step 1 that the specification of the detection section including the reluctor missing portion is completed, the process moves to Step 2 for branching by the pulse number. In the branching, when the pulse number is 6, the process proceeds to Step 3 to perform processing required when the pulse with the pulse number 6 is generated, and when the pulse numbers are 5, 4 and 3, the process proceeds to Steps 4, 5 and 6 to perform processing required when the pulse with the pulse number 5 is generated, processing required when the pulse with the pulse number 4 is generated, and processing required when the pulse with the pulse number 3 is generated, and then finish the routine. When the pulse number is 2, the process proceeds to Step 7 to determine whether the phase signal Vph is an H level. When it is determined that the phase signal Vph is the H level (the engine rotates forward), the process proceeds to Step 8 to perform an ignition operation of the engine. Then, in Step 9, processing required when the pulse with the pulse number 2 is generated is performed, and then the routine is finished. When it is determined in Step 7 that the level of the phase signal Vph is not the H level (the engine rotates in reverse), the process moves to Step 9 without performing the ignition operation. Specifically, when it is determined that the engine rotates in reverse, the ignition of the engine is prevented to stop the engine.

When the pulse numbers are 1 and 0, the process proceeds to Steps 10 and 11, respectively, to perform processing required when the pulse with the pulse number 1 is generated and processing required when the pulse with the pulse number 0 is generated, and then finish the routine.

According to the algorithm in FIG. 12, the rotational direction determination means is constructed by Step 7.

Figure 8:
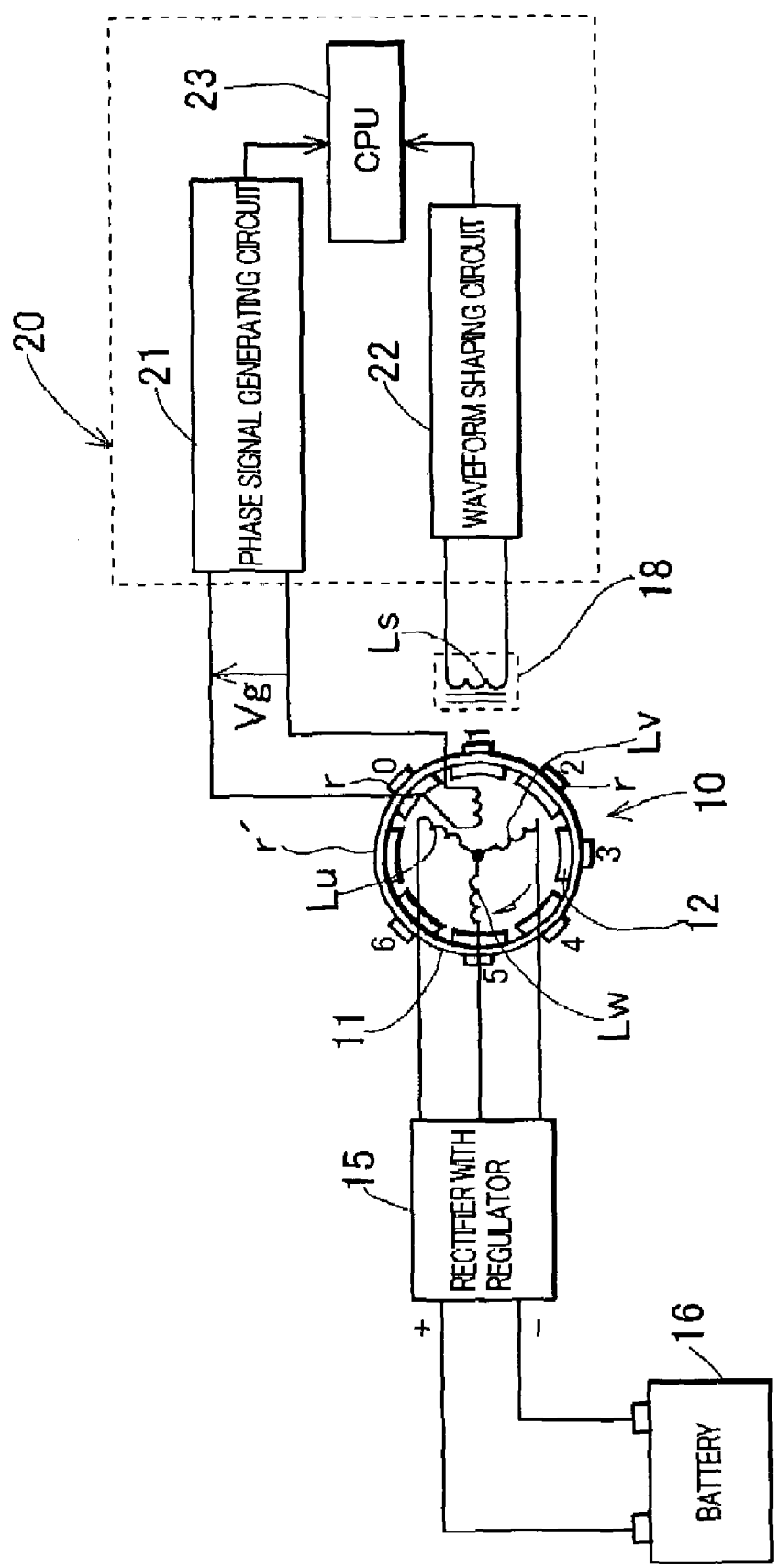
FIG. 8 is a circuit diagram of a construction of another hardware suitable for use in an embodiment of the invention.

In the above described embodiment, the AC voltage for generating the phase signal from one phase of the three-phase armature coil that generates the output for charging the battery is taken out, but as shown in FIG. 8, a dedicated single-phase armature coil L1 may be separately provided in a generator for obtaining a phase signal to obtain an AC voltage Vg for generating a phase signal from the single-phase armature coil. For such a construction, a waveform of the AC voltage Vg is not deformed even if the regulator is operated, and thus the reference crank angle position can be identified by a method for specifying the detection section including the reluctor missing portion from the number of detections of the phase to be detected of the phase signal in each detection section without changing the detection method from during extremely low speed rotation to during high speed rotation.

In the above described embodiment, the three-phase generator is used, but a single-phase AC generator may be of course used.

In each of the above described embodiment, the generator generates an 8-cycle AC voltage per rotation of the crankshaft, and the seven reluctors are provided on the rotor of the signal generating device, but the invention is not limited to this, and a generator that rotates in synchronization with the crankshaft to output an n-cycle AC voltage (n is an even number equal to 4 or more). A signal generating device may be used that includes a rotor in which one of n reluctors (n is an even number equal to or more than 4) arranged at regular intervals in a rotational direction of a crankshaft of an engine is removed, a total of n-1 reluctors are arranged in the rotational direction, and a portion from which one reluctor is removed is a reluctor missing portion, and a pulse signal generator that detects an edge of each of the n-1 reluctors provided on the rotor to generate a pulse, the pulse signal generator detecting an edge of any reluctor of the rotor to generate a pulse when a crank angle position of the engine matches a reference crank angle position.

As described above, according to the invention, the difference between the count value counted by the counting means in the detection section including the reluctor missing portion and the count value counted by the counting means in other detection sections is used to specify the detection section including the reluctor missing portion without identifying the lengths of the generation intervals of the pulses, thereby allowing the detection section including the reluctor missing portion to be properly specified to identify the pulse generated at the reference crank angle position, even if an initial blast of the engine occurs at the start of the engine and the rotational speed of the engine suddenly increases, or the pulsation of the rotational speed is large.

In the invention, the singular point of the waveform of the AC voltage output by the generator mounted to the engine is detected to detect the specific crank angle position and specify the detection section including the reluctor missing portion according to the number of detections of the specific crank angle position in each detection section, thereby allowing the detection section including the reluctor missing portion to be specified without using a special position sensor such as a rotary encoder that detects a crank angle position. This allows the rotation information detection device that can properly detect information on the reference crank angle position to be obtained without increasing costs.

Further in the invention, the lengths of the detection sections successively appearing with the rotation of the rotor are compared to specify the detection section including the reluctor missing portion when the signal system of the phase signal is abnormal, thereby allowing the information on the reference crank angle position to be obtained to drive the engine even if an abnormality such as the breaking of a wire occurs in a supply system of the phase signal and no phase signal is provided.

In the invention, the phase in which the level of the phase signal obtained from the AC voltage output by the generator mounted to the engine changes is used as the phase to be detected (the singular point of the waveform of the AC voltage to be detected) to specify the detection section including the reluctor missing portion according to the number of detections of the phase to be detected in each detection section before the start of the engine is completed, and the lengths of the detection sections successively appearing with the rotation of the rotor are compared without using the phase signal to specify the detection section including the reluctor missing portion after the start of the engine is completed. This allows the detection section including the reluctor missing portion to be specified to obtain information on the reference crank angle position of the engine even if the regulator that short-circuits the output of the generator when the output voltage of the generator exceeds the set value after the engine is started is provided to deform the waveform of the output voltage of the generator.

Further in the invention, the rotational direction determination means is provided to allow detection of the reverse rotation of the engine, thereby allowing safety measures to be taken for stopping the ignition operation to prevent the reverse rotation of the engine when the engine is about to rotate in reverse by an insufficient start operation force at the start of the engine.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An engine rotation information detection device that detects rotation information including information on a reference crank angle position of an engine comprising:
    signal generating device including a rotor in which one of n reluctors (n is an integer equal to or more than three) arranged at regular intervals in a rotational direction of a crankshaft of said engine is missed, a total of n-1 reluctors are arranged in said rotational direction, and a portion from which said one reluctor is missed is a reluctor missing portion, and a pulse signal generator that detects an edge of each of the n-1 reluctors provided on said rotor to generate a pulse, said pulse signal generator detecting an edge of any reluctor of said rotor to generate a pulse when a crank angle position of said engine matches said reference crank angle position;
    a generator that rotates in synchronization with said crankshaft to output an nxm-cycle AC voltage (m is an integer equal to or more than one);
    counting means that counts the number of detections of a singular point of a waveform of said AC voltage in each detection section, said detection section being a section between a crank angle position where said pulse signal generator detects the edge of each reluctor to generate a pulse and a crank angle position where said pulse signal generator detects a next reluctor to generate a pulse; and
    reference crank angle position identification means that uses a difference between a count value counted by said counting means in a detection section including said reluctor missing portion and a count value counted by said counting means in other detection sections to specify the detection section including the reluctor missing portion and identify a pulse generated at said reference crank angle position based on the specified detection section.

2. The engine rotation information detection device according to claim 1, wherein the singular point of the waveform of said AC voltage is a point at which said AC voltage reaches a predetermined threshold value level.

3. The engine rotation information detection device according to claim 1, wherein the singular point of the waveform of said AC voltage is a zero point of the waveform of said AC voltage.

4. The engine rotation information detection device according to claim 1, wherein the singular point of the waveform of said AC voltage is a peak point of the waveform of said AC voltage.

5. The engine rotation information detection device according to claim 1,
    wherein said signal generating device is a pulse signal generator that detects a leading edge and a trailing edge in the rotational direction of each of said reluctors to generate a leading edge pulse and a trailing edge pulse paired with each other, said pulse signal generator being constructed so as to detect the leading edge pulse or the trailing edge pulse of any reluctor of said rotor to generate a pulse when a crank angle position of said engine snatches said reference crank angle position,
    wherein there are further provided: a phase signal generating circuit that shapes a waveform of said AC voltage, and generates a phase signal that shows a first level during a period when a voltage of a half wave of one polarity of said AC voltage is a threshold value or more, and a second level during other periods; and a waveform shaping circuit that generates a crank angle pulse that keeps a predetermined level between when said pulse signal generator generates each leading edge pulse and when said pulse signal generator generates each trailing edge pulse paired with said leading edge pulse,
    wherein said counting means is constructed to count the number of detections of a phase to be detected which shows said singular point in a detection section, said detection section being a section between a crank angle position corresponding to any edge of each crank angle pulse generated by said waveform shaping circuit and a crank angle position corresponding to any edge of a next crank angle pulse, and said phase to be detected being at least one of a phase in which a level of said phase signal changes from the first level to the second level and a phase in which the level of said phase signal changes from the second level to the first level; and
    wherein a phase relationship between the phase signal and the series of pulses generated by the pulse signal generator is set so that said phase signal shows the first level when said waveform shaping circuit generates each crank angle pulse.

* * * * *